United States Patent [19]

Shin et al.

[11] 3,965,251

[45] June 22, 1976

[54] METHOD OF REGENERATING A DEGRADED WORKING SOLUTION FOR THE PRODUCTION OF HYDROGEN PEROXIDE

[75] Inventors: Hiroshi Shin; Junichiro Sugano, both of Yokkaichi; Tadashi Yoshii, Tokyo; Kichiro Iwamoto, Yokkaichi; Yasuhisa Kuriyama, Yokkaichi; Minoru Kakuda, Yokkaichi, all of Japan

[73] Assignee: Mitsubishi Gas Chemical Company, Inc., Tokyo, Japan

[22] Filed: Aug. 2, 1973

[21] Appl. No.: 384,846

Related U.S. Application Data

[63] Continuation-in-part of Ser. No. 172,244, Aug. 16, 1971, abandoned.

[30] Foreign Application Priority Data

Aug. 18, 1970 Japan..............................45-71894

[52] U.S. Cl................................. 423/588; 260/369
[51] Int. Cl.² ........................................ C01B 15/02
[58] Field of Search ............ 423/588, 590; 252/472; 260/369

[56] References Cited
UNITED STATES PATENTS 3,150,930 9/1964 Hiratsuka et al. ................... 423/588
3,432,267 3/1969 Lee et al............................. 423/588

Primary Examiner—Oscar R. Veritz
Assistant Examiner—Eugene T. Wheelock
Attorney, Agent, or Firm—Sughrue, Rothwell, Mion, Zinn & Macpeak

[57] ABSTRACT

A working solution comprising anthraquinone and its derivatives, used for the production of hydrogen peroxide on becoming degraded by formation of non-effective anthraquinone is generated by an auto-oxidation process employing anthraquinone, which comprises:

contacting, at a temperature of below 130°C., and in the presence of a catalyst comprising a metal selected from a platinum group and supported on a carrier, said degraded working solution, which comprises non-effective anthraquinone and tetrahydroanthraquinone with an olefinic compound whose hydrogenation product is gaseous at said contact temperature and subsequently, contacting the thus treated working solution, at a temperature above 130°C., and in the presence of a catalyst comprising a metal selected from the platinum group and supported on a carrier, with an olefinic compound whose hydrogenation product is gaseous at said contact temperature, said method being characterized by the fact that at a temperature below 130°C., the regeneration of non-effective anthraquinone is accelerated much faster than the dehydrogenation reaction of tetrahydroquinone and therefore, at a pont in time, when all non-effective anthraquinone has been converted to anthraquinone, the temperature can be raised above 130°C. to permit dehydrogenation of said tetrahydroanthraquinone without incurring any impedance of the dehydrogenation reaction.

4 Claims, No Drawings

METHOD OF REGENERATING A DEGRADED WORKING SOLUTION FOR THE PRODUCTION OF HYDROGEN PEROXIDE

CROSS-REFERENCES TO RELATED APPLICATION

This application is a continuation-in-part application of our earlier co-pending application, Ser. No. 172,244, filed on Aug. 16, 1971, now abandoned, and claims priority from Aug. 18, 1970 based on Japanese Pat. application Ser. No. Sho-45-71894.

DETAILED DESCRIPTION OF THE INVENTION

This invention relates to a method of regenerating a degraded working solution for the production of hydrogen peroxide by an auto-oxidation process employing anthraquinones.

In the production of hydrogen peroxide by the auto-oxidation process, a working solution containing effective anthraquinones such as nuclear position alkylated anthraquinone and nuclear position alkylated tetrahydroanthraquinone (formulas I and V, respectively, indicated below) has been conventionally used.

For instance, as is shown in the following equation, effective anthraquinones are catalytically hydrogenated to the corresponding anthrahydroquinones (formulas II and III), and the resulting anthrahydroquinones are oxidized with molecular oxygen containing gas to regenerate the anthraquinones and the hydrogen peroxide formed is extracted with water to separate from the working solution.

R: alkyl group

As the hydrogenation and the oxidation reaction of effective anthraquinone are repeated, undesirable substances are formed by side reactions, which do not effect in the transformation between quinone and hydroquinone even if the hydrogenation and the oxidation reaction are carried out under the normal condition.

The undesirable substances are classified in (1) oxyanthrone (formula IV) and the likes and (2) other degraded substances.

The substance shown in (1) is the one of the abnormally reduced substances of anthraquinone which is determined in the following manner and are herein termed "noneffective anthraquinone".

Determination of noneffective anthraquinone:

A portion of a working solution is treated with oxygen gas at the room temperature to oxidize completely the anthrahydroquinones which remain unoxidized, and then washed.

To a weighed sample taken from the solution treated in the above manner is added a larger amount of tetrahydroanthraquinone than that of noneffective anthraquinone which is supposed to be contained and then is led a stream of nitrogen gas for 10 minutes. The following handlings are carried out in the atmosphere of nitrogen to avoid contact with oxygen. An amine, for example triethylamine, is added as catalyst to the sample in the amount of 1%, and is allowed to stand for 30 minutes at the room temperature. The reaction is exemplified as follows.

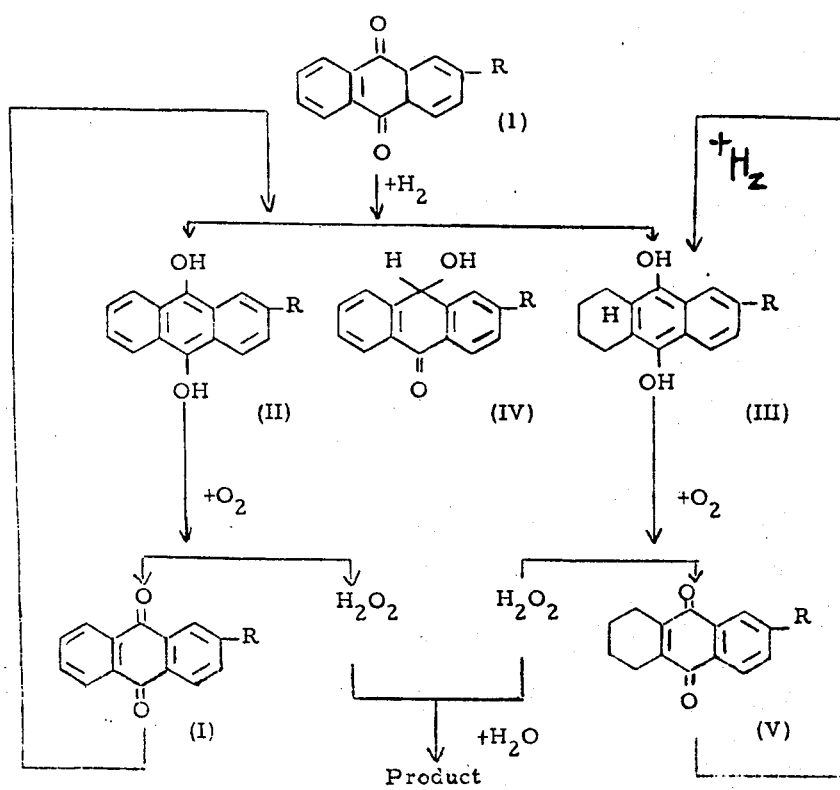

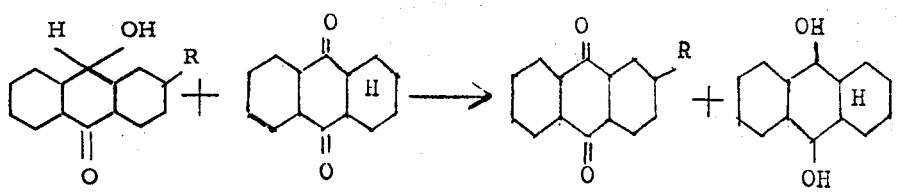

Tetrahydroanthrahydroquinone thus formed is determined with an oxidizing agent such as lead tetraacetate or chloranil by means of potentiometric titration.

Moles of the oxidizing agent consumed in the titration moles of tetrahydroanthrahydroquinone in the sample moles of noneffective anthraquinone in the sample Although the undesirable substances formed in the hydrogen peroxide production process are extremely slight in the amount per cycle, they are progressively accumulated in recycling the same working solution for a long term. That not only results in decrease of the effective anthraquinone concentration of the working solution but causes various obstacles in the process.

Heretofore, there have been some proposals for the process for regenerating a degraded solution. It has been reported that the working solution can be treated in the presence of an ion exchange resin or a base as catalyst and sequently with an oxidizing agent to promote the reaction. But in such treatment a considerable amount of noneffective anthraquinone has been found to be converted into the degraded substances which can hardly be regenerated.

The present invention is to provide a more efficient method for regenerating a degraded working solution, minimizing the formation of degraded substances.

According to the present invention, the working solution containing noneffective anthraquinone in the production of hydrogen peroxide by an auto-oxidation process is contacted with an olefinic compound at a temperature below 130°C in the presence of a supported catalyst which comprises a metal selected from the platinum group, whereby noneffective anthraquinone is regenerated to effective anthraquinone.

As taught in U.S. Pat. No. 3,150,930, tetrahydroanthraquinone is dehydrogenated to the corresponding anthraquinone at 80°–300°C in the presence of an olefinic compound as hydrogen acceptor with such a catalyst as employed in the present invention.

However, if the working solution to be treated in the above manner contains noneffective anthraquinone, not only the dehydrogenation of tetrahydroanthraquinone is retarded but the catalyst becomes poisoned not to promote the reaction.

For example, in the solution of 0.1 mol./l. of noneffective anthraquinone the dehydrogenation velocity of tetrahydroanthraquinone is lowered at 150°–170°C to about one half of that in the absence of noneffective anthraquinone and the life time of the catalyst for the dehydrogenation is not only shortened but also degraded substances are by-produced. And in the case of 0.05 mol./l. at about 100°C the dehydrogenation velocity is rendered close to zero.

Now the inventors have found that if the working solution is treated at a temperature below 130°C noneffective anthraquinone is converted to effective anthraquinone, while tetrahydroanthraquinone is hardly dehydrogenated and also the formation of the harmful substances for a catalyst to be used in the hydrogenation step of an anthraquinone process is extremely small.

Particularly, a temperature of from 70°–120°C is preferred, since the reaction velocity is practically satisfactory in the regenerating treatment, and a working solution containing more than 0.02 mol./l. of noneffective anthraquinone is preferably treated.

The catalyst for the present invention consists of a metal selected from the platinum group, such as platinum, palladium, ruthenium, or a mixture thereof, which is supported on a carrier, and can also contain other metal such as nickel, silver, or copper. The carrier suitably used for the catalyst is an alkaline earth metal oxide such as calcium oxide or magnesium oxide, alumina, or a compound composed largely of the above oxide, that is, $CaO.Al_2O_3$, $MgO.Al_2O_3$, $MgO.SiO_2$ or the like. As the catalyst supported on a carrier of the present invention, for example, $Pt-Al_2O_3$, $Pd-Al_2O_3$, or $Pd-MgO.Al_2O_3$ can be mentioned.

The catalyst, for example $Pd-Al_2O_3$, can be prepared as follows: an active alumina of which the particle size is 100–200 mesh, is suspended in water; to the suspension is added an aqueous $Na_2PdCl_4$ solution and by stirring the palladium salt is almost adsorbed on a carrier; to the solution is added an aqueous formaldehyde solution, while the pH of the solution being adjusted to 9–10 by the addition of an aqueous NaOH solution; the solution is heated with stirring and the $Pd-Al_2O_3$ is formed by the reduction of the palladium salt; the $Pd-Al_2O_3$ thus formed is washed with deionized water and then dried at below 100°C.

In the process of the present invention, the main reaction where noneffective anthraquinone is converted to effective anthraquinone, is dehydrogenation and an olefinic compound serves as an acceptor for hydrogen liberated from noneffective anthraquinone. For the olefin employed as an acceptor for hydrogen, it is preferable that its hydrogenated product is gaseous at the reaction temperature, since the gaseous product is easily removed from the reaction system so that the reaction can be carried out more advantageously. Particularly, ethylene, propylene and butylene are preferable acceptors for hydrogen.

The working solution is prepared by dissolving alkylanthraquinone and alkyltetrahydroanthraquinone in a mixed solvent consisting of higher alcohol and alkylated aromatic hydrocarbon.

After the working solution has been used continuously for a long period, it is found to contain a considerable amount of noneffective anthraquinone which has been formed by the abnormal reduction of effective anthraquinone. The catalyst is added into the working solution containing noneffective anthraquinone, and the working solution is contacted with an olefin gas or an inert gas containing an olefin at a temperature below 130°C. The working solution may be contacted with the gas by means of an agitated vessel in which the gas is sucked in or bubbled, or of a tower into which the gas is introduced though a perforated plate or a diffusion nozzle.

Because the oxidation velocity of tetrahydroanthraquinone is far lower than that of anthraquinone, it has been desired in the hydrogen peroxide production process by the cyclic operation, to dehydrogenate tetrahydroanthraquinone in the working solution to anthraquinone more efficiently. The working solution regenerated according to the present invention can be successfully submitted to the dehydrogenation of tetrahydroanthraquinone such as described in U.S. Pat. No. 3,150,930, without causing decrease of the dehydrogenation velocity and losing the high activity of the catalyst.

EXAMPLE 1

A working solution was prepared by dissolving 2-amylanthraquinone at a concentration of about 1 mol./l. in a mixture of trimethylbenzene and diisobutylcarbinol in the ratio of 50:50 by volume. Hydrogen peroxide was produced consecutively for a long time by employing the above working solution in the cyclic operation involving the alternate hydrogenation of the anthraquinone and oxidation of the resulting anthrahydroquinone to regenerate the anthraquinone which is recycled after extraction of the hydrogen peroxide formed with water. As is shown from the following Table 1, the resulting working solution was found to have noneffective anthraquinone at a concentration of 0.12 mol./l. To 1 l. of the working solution were added 30 grams of Pd—MgO.Al$_2$O$_3$ catalyst having a metallic palladium content of 1% which was prepared by the method hereinbefore described, and the working solution was heated at 90°C for 30 minutes with stirring under introduction of a stream of ethylene gas. As a result of the treatment, the noneffective anthraquinone was regenerated to 2-amylanthraquinone. Figures in Table 1 indicate the concentrations of the components involved in the working solution (mol./l.). The dehydrogenation of tetra-hydroanthraquinone in the regeneration treatment is hardly recognized.

Hereinafter, anthraquinone, tetrahydroanthraquinone, noneffective anthraquinone, and degraded substances are designated as AQ, THAQ, NAQ, and DS, respectively.

Table 1

|  | AQ | THAQ | NAQ | DS |
| --- | --- | --- | --- | --- |
| at the preparation | 1.00 | 0.00 | 0.00 | 0.00 |
| before regeneration | 0.65 | 0.09 | 0.12 | 0.14 |
| after regeneration | 0.77 | 0.09 | 0.00 | 0.14 |

1. A working solution regenerated in Example 1 was reacted by introducing ethylene with constant stirring in the presence of the same catalyst as used in Example 1 at a concentration of 100 g./l. at 160°C for about 30 minutes. The temperature as high as 160°C was applied for the dehydrogenation of tetrahydroanthraquinone to anthraquinone.
2. A degraded working solution which has not yet been subjected to the regeneration treatment in Example 1, was reacted for the dehydrogenation of tetrahydroanthraquinone under the same condition as described in the above (1).

Table 2 shows the concentrations of tetrahydroanthraquinone in the working solution (mol./l.) treated in the above (1) and (2). The quantity of the anthraquinone regenerated by the dehydrogenation of tetrahydroanthraquinone in the working solution treated in Example 1 was three times as large as that in the working solution which has not yet been treated.

Table 2

|  | before dehydrogenation | after dehydrogenation | difference of the concentration |
| --- | --- | --- | --- |
| 1) | 0.09 | 0.06 | 0.03 |

Table 2-continued

|  | before dehydrogenation | after dehydrogenation | difference of the concentration |
| --- | --- | --- | --- |
| 2) | 0.09 | 0.08 | 0.01 |

EXAMPLE 2

A working solution was prepared by dissolving 2-butylanthraquinone at a concentration of about 0.6 mol./l. in a mixture of tetramethylbenzene and diisobutylcarbinol in the ratio of 50:50 by volume. The working solution was recycled as described in Example 1, and thus obtained a degraded working solution containing noneffective anthraquinone and degraded substances.

A 1 l. sample of the degraded working solution was stirred under introduction of propylene containing about 50% propane by volume in the presence of 30 grams of Pd.Pt—Al$_2$O$_3$ catalyst at 90°C for 40 minutes. The catalyst was prepared by making palladium and platinum salts adsorbed on Al$_2$O$_3$ at a concentration corresponding 0.9% metallic palladium and 0.1% metallic platinum by weight, and then reducing the salts with formaldehyde in alkaline solution.

The concentrations of the components involved in the working solution were determined. The result is shown in Table 3.

Table 3

|  | AQ | THAQ | NAQ | DS |
| --- | --- | --- | --- | --- |
| at the preparation | 0.60 | 0.00 | 0.00 | 0.00 |
| before regeneration | 0.41 | 0.09 | 0.10 | 0.9 |
| after regeneration | 0.51 | 0.09 | 0.00 | 0.9 |

EXAMPLE 3

A working solution was prepared by dissolving 2-ethylanthraquinone and 2-ethyltetrahydroanthraquinone at a concentration of 0.3 mol./l. and 0.3 mol./l., respectively, in a mixture of tetramethylbenzene and diisobutylcarbinol in the ratio of 50:50 by volume. The working solution was recycled as described in Example 1, and thus was obtained a degraded working solution.

A 1 l. sample of the degraded working solution was stirred under introduction of butylene in the presence of Pd—CaO.Al$_2$O$_3$ catalyst at 100°C for 45 minutes. The catalyst was prepared by making palladium salt adsorbed on a CaO.Al$_2$O$_3$ at a concentration of 1% metallic palladium by weight, and then reducing the salt with formaldehyde in alkaline solution. The concentrations of the components in the working solution were determined. The result is shown in Table 4.

Table 4

|  | AQ | THAQ | NAQ | DS |
| --- | --- | --- | --- | --- |
| at the preparation | 0.30 | 0.30 | 0.00 | 0.00 |
| before regeneration | 0.19 | 0.31 | 0.05 | 0.05 |
| after regeneration | 0.24 | 0.31 | 0.00 | 0.05 |

EXAMPLES 4 to 5

A working solution was prepared by dissolving 2-amylanthraquinone at a concentration of about 1.20 mol./l. in a mixture of trimethylbenzene and diisobutylcarbinol in the ratio of 50:50 by volume. The working solution was recycled as described in Example 1, and thus was obtained a degraded working solution.

Two 1 l. samples of the degraded working solution were separately stirred under introduction of ethylene in the presence of each 50 grams of catalysts, one of which being Pt—MgO.Al$_2$O$_3$ and the other Ru—MgO.Al$_2$O$_3$ at 90°C for 1 hour. The concentrations of the components in each working solution were determined. The result is shown in Table 5.

Table 5

|  | AQ | THAQ | NAQ | DS |
|---|---|---|---|---|
| at the preparation | 1.20 | 0.00 | 0.00 | 0.00 |
| before regeneration | 0.90 | 0.07 | 0.20 | 0.03 |
| after regeneration |  |  |  |  |
| Example 4 | 1.10 | 0.07 | 0.00 | 0.03 |
| Example 5 | 1.10 | 0.07 | 0.00 | 0.03 |

EXAMPLE 6

The following table shows the results on the dehydrogenation of tetrahydroanthraquinone carried out in two cases described in Example 1.

E$_2$, E$_3$ and E$_{4,5}$ in the table related to Examples 2, 3 and 4 or 5, respectively:

Table 6

|  |  | before dehydrogenation | after dehydrogenation | difference of the concentration |
|---|---|---|---|---|
| E$_2$ | 1) | 0.09 | 0.06 | 0.03 |
|  | 2) | 0.09 | 0.08 | 0.01 |
| E$_3$ | 1) | 0.31 | 0.24 | 0.07 |
|  | 2) | 0.31 | 0.29 | 0.02 |
| E$_{4,5}$ | 1) | 0.07 | 0.04 | 0.03 |
|  | 2) | 0.07 | 0.06 | 0.01 |

The dehydrogenation conditions in the above experiments were as follows:

E$_2$: the same as in Example 1.
E$_3$:
  introduced gas: ethylene + ethane (30:70 by volume).
  catalyst: Pd (1%) - MgO.Al$_2$O$_3$, 100 g./l. working solution.
  reaction: at 145°C for 30 minutes.
E$_{4,5}$:
  introduced gas: ethylene + ethane (25:75) by volume).
  catalyst: Pd(1%) - MgO.Al$_2$O$_3$, 100 g./l. working solution.
  reaction: at 150°C for one hour.

The rate of the dehydrogenation of tetrahydroanthraquinone according to the present method is more than 3 times as great as that of the prior art.

Although the present invention has been adequately described in the foregoing specification and Examples included therein, it is readily apparent that various changes and modifications can be made thereto, without departing from the spirit and scope thereof.

What is claimed is:

1. A method for regenerating a degraded working solution for the production of hydrogen peroxide by an auto-oxidation process employing an anthraquinone, which comprises:

contacting at a temperature of below 130°C, but a temperature sufficient to convert non-effective anthraquinone to effective anthraquinone, and in the presence of a catalyst comprising a metal selected from the group consisting of platinum group metals supported on an alkaline earth metal oxide carrier selected from the group consisting of CaO, MgO, Al$_2$O$_3$, CaO.Al$_2$O$_3$, MgO.SiO$_2$, and MgO.Al$_2$O$_3$, said degraded working solution, which comprises more than 0.02 moles of non-effective anthraquinone per liter of working solution and tetrahydroanthraquinone, with an olefinic compound whose hydrogenation product is gaseous at said contact temperature to accelerate regeneration of non-effective anthraquinone faster than the dehydrogenation reaction of tetrahydroanthraquinone to convert substantially all non-effective anthraquinone to anthraquinone and removing the hydrogenation product of the olefinic compound; and subsequently contacting the thus treated working solution at a temperature above 130°C., said temperature being sufficient to promote the dehydrogenation reaction of said tetrahydroanthraquinone, and in the presence of said catalyst, with an olefinic compound whose hydrogenation product is gaseous at said contact temperature to dehydrogenate said tetrahydroanthraquinone without incurring any impedance of the dehydrogenation reaction and removing the hydrogenation product of the olefinic compound.

2. The method of claim 1, wherein said regeneration is carried out at a temperature of from 70° to 120°C.

3. The method of claim 1, wherein said metal serving as the catalyst is a metal selected from the group consisting of platinum, palladium, ruthenium and mixtures thereof.

4. The method of claim 1, wherein said olefinic compound is a member selected from the group consisting of ethylene, propylene and butylene.

\* \* \* \* \*